United States Patent [19]

Moran et al.

[11] 4,414,236

[45] Nov. 8, 1983

[54] EDIBLE EMULSIONS CONTAINING GELLING AGENTS

[75] Inventors: David P. J. Moran, Covington; John J Hepburn, Harpenden, both of England

[73] Assignee: Lever Brothers Company, New York, N.Y.

[21] Appl. No.: 274,609

[22] Filed: Jun. 17, 1981

Related U.S. Application Data

[63] Continuation of Ser. No. 95,122, Nov. 16, 1979, abandoned.

[30] Foreign Application Priority Data

Nov. 16, 1978 [GB] United Kingdom ............... 44799/78

[51] Int. Cl.³ .......................... A23D 3/00; A23D 5/00
[52] U.S. Cl. .................................. 426/573; 426/575; 426/602; 426/603
[58] Field of Search ............... 426/573, 575, 602, 603, 426/604

[56] References Cited

U.S. PATENT DOCUMENTS

| | | | |
|---|---|---|---|
| 2,203,643 | 6/1940 | Musher | 426/602 |
| 3,366,492 | 1/1968 | Voss et al. | 426/603 |
| 4,112,132 | 9/1978 | Badertscher et al. | 426/603 |

FOREIGN PATENT DOCUMENTS 49-8863  2/1974  Japan ................................. 426/573

*Primary Examiner*—Robert A. Yoncoskie
*Attorney, Agent, or Firm*—Milton L. Honig; James J. Farrell

[57] ABSTRACT

The invention provides fat-continuous emulsions containing medium melting gelling agents, i.e. those with a softening point of >33° C. and a sharp decrease in gel strength at 45°–70° C., the gel strength below the softening point being 0.1–30 N/cm². Suitable gelling agents include e.g. carrageenan/locust bean gum mixtures.

6 Claims, No Drawings

EDIBLE EMULSIONS CONTAINING GELLING AGENTS

This is a continuation of application Ser. No. 095,122 filed Nov. 16, 1979, now abandoned.

The invention is concerned with emulsions of the fat-continuous type, containing a gelled dispersed aqueous phase.

The emulsions of the present invention comprise a continuous fatty phase and a dispersed aqueous phase, which is gelled with a gelling system of a softening point of at least 33° C. and which shows a sharp decrease in gel strength at 45° to 70° C., preferably 50° to 65° C., the gelled aqueous phase being of a gel strength at a temperature below the softening point of between 0.1 and 30 $N/cm^2$, as measured by the Instron apparatus, using it in the linear compression test mode at room temperature (about 20° C.).

In this Specification by the term "gelled" is understood the condition which liquid ingredients have achieved as a result of the formation of a rigid colloidal system by molecules and aggregates of molecules of the gelling system joining together to form a continuous framework. By "softening point" is understood the lowest temperature at which the temperature/gel strength curve shows a marked deviation from the horizontal i.e. a marked decrease in gel strength.

The terms "gel", "gelling", etc. refer to the condition of, and the process leading to the formation of, such a rigid colloidal system.

The terms "oils" and "fats" are used in this Specification as synonyms, unless otherwise indicated; a fatty phase is within the scope of the present invention the continuous phase of an emulsion and contains triglyceride oils and fats.

In the preparation of emulsions of the fat-continuous type it has been suggested to thicken one of the phases of the emulsion, and mostly the dispersed aqueous phase with, for example, fats, hydrophilic thickening agents like gums, proteins, etc.

Frequently problems in respect of diminished organoleptic qualities, insufficient microbiological keeping qualities and/or insufficient emulsion stability were observed in such prior art products.

The invention particularly relates to edible emulsions like margarine and low-fat spreads, particularly low-fat spreads containing protein in the dispersed aqueous phase.

Suitably the weight ratio between the continuous fatty phase and the dispersed phase is between (18–82):(82–18), preferably (35–65):(65–35), particularly about 40:60.

The gelling agents to be used in the emulsions of the present invention are of the medium-melting type.

Low-melting type gelling agents, e.g. gelatin, are often more difficult to process and may result in products of too sticky a mouthfeel (when used in relatively high proportions) or too watery products (when used at relatively low levels).

The high-melting type gelling agents (e.g. agar, which melts at about 90°–95° C.) generally have a very much delayed setting, a rather poor flavour release and moreover easily evolve free water, due to syneresis The medium-melting gelling agents to be used in the emulsions of the invention are more rapidly setting, which allows a simple processing, have a rather high gel strength, which allows the formation of small droplets of the dispersed phase since the risk of coalescence during emulsion preparation is reduced, have a controllable viscosity, which results in a less watery taste of the emulsion and a higher emulsion stability, and finally are highly elastic, which allows the preparation of emulsions of a more butterlike plasticity.

Particularly emulsions are provided containing in the dispersed aqueous phase at least two polysaccharides, one of which being locust bean gum.

Suitably the other polysaccharide includes xanthan gum and/or carrageenan.

Preferably 0.1 to 2.0%, especially 0.225 to 1.0% of locust bean gum and 0.3 to 2.0%, especially 0.75 to 1.66% of carrageenan or xanthan gum (or a mixture of at least these gums) calculated on the weight of the aqueous phase is used in the emulsions of the present invention. Similar proportions can be used of alternatives of the gelling agents mentioned specifically. To facilitate gel setting, the presence of some proteins and/or inorganic salt, e.g. KCl, can be beneficial.

Suitable proportions of proteins are e.g. from 0.1 to 20%, preferably from 1 to 18%, of the emulsion; inorganic salts such as KCl can be used in proportions of up to 0.7%, preferably 0.15 to 0.5% (calculated on the weight of the agueous phase).

If emulsions are to be prepared with a less rapidly setting aqueous phase, minor amounts of low-melting gelling agents can be added in addition to the medium-melting gelling agents e.g. 0.1 to 0.5% of gelatin or similar low-melting gelling agents. This may be advantageous for avoiding complete setting during processing of the emulsion, since complete setting during processing could lead to damaging of the gel-structures. Similarly medium-melting gelling systems can be used that have been prepared by complexing gelatin with appropriate polysaccharides to modify the gel properties of the gelatin itself.

In principle there are no limitations as to the fat or fat blend to be used in the emulsions of the present invention.

Fats that are liquid at room temperature can be used in preparing pourable fat-continuous emulsions and fats that are plastic at room temperature are useful for the preparation of plastic emulsions e.g. margarines and low-fat spreads.

Preferably the fat-continuous emulsions contain a fatty phase of dilatation value at 10° C. of at least 150, preferably at least 250, and at 35° C. of no more than 50, preferably no more than 25.

The gelled aqueous phase of the emulsions of the invention can contain or consist of gelled water, but preferably the aqueous phase is prepared from a proteinaceous aqueous phase, for instance skim-milk, full-fat milk, buttermilk, etc.; similarly protein-enriched concentrates can be used or reconstituted proteinaceous solutions or dispersions e.g. obtained by blending skim-milk powder, buttermilk powder etc. etc. in water. The presence of proteins in at least the aqueous phase will help to destabilize the emulsion under palate conditions.

The emulsions preferably also contain emulsifiers, e.g. phosphatides and/or partial glyceride esters, for instance monoglycerides, for stabilizing the emulsion.

The invention will be illustrated by the following Examples:

EXAMPLE I

A fat-continuous low-fat spread was prepared from the following ingredients:

|  | wt % in product |
| --- | --- |
| Aqueous phase: | |
| Demineralised water | 75.03 |
| Salt | 2.75 |
| Carrageenan | 0.75 |
| Locust bean gum | 0.511 |
| Potassium chloride | 0.241 |
| Potassium sorbate | 0.134 |
| Lactic acid | 0.05 |
| Fatty phase: | |
| Fat blend | 20.00 |
| Hymono SF44 | 0.50 |
| Colouring matter | 0.015 |
| Flavour | 0.016 |
| pH = 4.8 | |

The method involves spraying the hot aqueous phase at 75° C. onto the hot melted oil (at 38° C.) containing emulsifier, colour and flavour. The drop size of the spray was bout 150–300 microns in diameter. The mix was constantly recycled through a pump and static mixer during the spraying process and the viscosity rose until the emulsion was finally at 179 Poises (at 6.4 secs.$^{-1}$), measured by Ferranti rotory viscometer. The product was then processed through a Votator A-unit, in which it was cooled to about 10–15° C., followed by an uncooled post-crystalliser unit.

Hymono SF44 is a trademark of Food Industries Ltd. Chemically it is an emulsifier with a high mono-glyceride content derived from edible vegetable oils and/or animal fats.

The gel strength at 20° C. was 19 N/cm$^2$.

The softening point was above 33° C. and at a temperature between 45° and 70° C. the gel strength/temperature curve showed a sharp decrease.

The emulsion obtained was, both from a micro-biological point of view and from an emulsion stability point of view, stable and had a butter-like plasticity.

EXAMPLE II

Another fat-continuous low-fat spread was prepared from the following ingredients, by the process described in Example I.

|  | wt % in product |
| --- | --- |
| Aqueous phase: | |
| Water | 51.68 |
| Butter serum | 4.6 |
| Sodium tripolyphosphate | 0.2 |
| Potassium chloride | 0.283 |
| Lactic acid | 0.13 |
| Carrageenan | 0.881 |
| Salt | 1.0 |
| Locust bean gum | 0.6 |
| Fatty phase: | |
| Butteroil | 24.0 |
| Margarine fat | 6.0 |
| Soya bean oil | 10.0 |
| Hymono SF44 | 0.6 |
| Vitamins | 0.0083 |
| Flavour | 0.0170 |

The gel strength was 28 N/cm$^2$.

The softening point was above 33° C. and at a temperature between 45° and 70° C. the gel strength/temperature curve showed a sharp decrease.

The emulsion obtained was, both from a micro-biological point of view and from an emulsion stability point of view, stable and had a butterlike plasticity.

EXAMPLE III

Example II was repeated, except that now 0.115% potassium chloride, 0.359% carrageenan and 0.483% locust bean gum (calculated on the emulsion) were used; the proportion of water was correspondingly adjusted.

Joha S9 is a trademark of Benckiser-Knapsack GMBH. Chemically it is identified as a polyphosphate salt.

The gel strength was 10 N/cm$^2$.

The softening point was above 33° C. and at a temperature between 45° and 70° C. the gel strength/temperature curve showed a sharp decrease.

The emulsion obtained was, both from a micro-biological point of view and from an emulsion stability point of view, stable and had a butterlike plasticity.

EXAMPLE IV

A low-fat spread of the W/O type was prepared, containing about 40% by weight of fat and 60% of a proteinaceous aqueous phase. The latter phase consisted of:

| Carrageenan | 1.2% | (by weight of the aqueous phase) |
| --- | --- | --- |
| Locust bean gum | 0.5% | |
| Milk | 59.16% | |
| Sodium caseinate | 4.49% | |
| Common salt | 2.17% | |
| Joha S 9 | 0.42% | |
| Curd | 11.67% | |
| Water | 20.0% | |
| Lactic acid to pH | 5.9 | |

The fat blend, which contained about 0.5% of saturated monoglycerides from fully hydrogenated lard and 0.2% of soyabean lecithin, was emulsified with the aqueous phase as follows:

The proteinaceous aqueous phase of a temperature of 55°–60° C. was pumped together with the fat blend to a mixing vessel. The mixture obtained was subsequently pasteurized at 80°–90° C. and cooled in a surface-scraped heat-exchanger to a temperature of 40° C. and in a second surface-scraped heat-exchanger to 16° C. The emulsion obtained was subsequently fed to a crystallizer unit, where sufficient residence time was given for increasing the solid fat content and the product leaving that crystallizer at about 18° C. was finally cooled in a surface-scraped heat-exchanger to a temperature of 11° C. and packed in plastic tubs.

The gel strength at 20° C. was found to be 0.5 N/cm$^2$; the softening point of the gelling system was above 33° C. and at a temperature between 45° and 70° C. the strength/temperature curve showed a sharp decrease.

The product obtained was micro-biological stable, had excellent organoleptic properties and did not show any water separation upon storage.

EXAMPLE V

Example IV was repeated except that an aqueous phase was used of a gel strength at 20° C. of 0.63 N/cm$^2$ (softening point > 33° C.) and a sharp decrease in the gel strength/temperature curve between 45° and 70° C.).

A very similar product was obtained; however, a finer distribution of gelled particles was observed, due to the fact that the processing conditions could be adjusted such that an optional particle size distribution was achievable.

The aqueous phase consisted of:

| | | |
|---|---|---|
| Carrageenan | 1.0% | (by weight of aqueous phase) |
| Locust bean gum | 0.33% | |
| Gelatin (bloom strength 150) | 0.417% | |
| Milk | 59.16% | |
| Sodium caseinate | 4.26% | |
| Common salt | 2.17% | |
| Sodium carboxymethylcellulose | 0.33% | |
| Joha S 9 | 0.42% | |
| Curd | 11.67% | |
| Water | 20.0% | |
| Lactic acid to pH 5.9 | | |

We claim:

1. Edible emulsions comprising a continuous fatty phase containing a plastic fat having a dilatation value at 10° C. of at least 150 and a dilatation value at 35° C. which does not exceed 50, and a dispersed aqueous phase in a weight ratio ranging from 18–82 to 82–18, in which the aqueous phase is gelled with a gelling system of a softening point of at least 33° C., showing a sharp decrease in gel strength at a temperature ranging from 45° to 70° C., said gelled aqueous phase having a gel strength at a temperature below the softening point ranging from 0.1 to 30 N/cm$^2$ as measured by Instron apparatus using it in the linear compression test method.

2. Emulsions according to claim 1, in which the weight ratio of the fatty phase to the aqueous phase is 35–65:65–35.

3. Emulsions according to claim 1, in which the gelling system comprises locust bean gum and at least one other polysaccharide selected from the group consisting of xanthan gum and carrageenan.

4. Emulsions according to claim 3, containing, calculated on the weight of the aqueous phase, 0.1–2.0% locust bean gum and 0.3–2.0% carrageenan or of a mixture of carrageenan and xanthan gum.

5. Emulsions according to claim 1, further containing proteins in emulsion stabilizing and nutritive amounts.

6. Emulsions according to claim 1, further containing the inorganic salts potassium chloride, sodium chloride or mixtures thereof.

* * * * *